Aug. 18, 1953   J. HARRINGTON   2,648,945
PORTABLE HAYSTACKER
Filed July 28, 1949   4 Sheets-Sheet 1
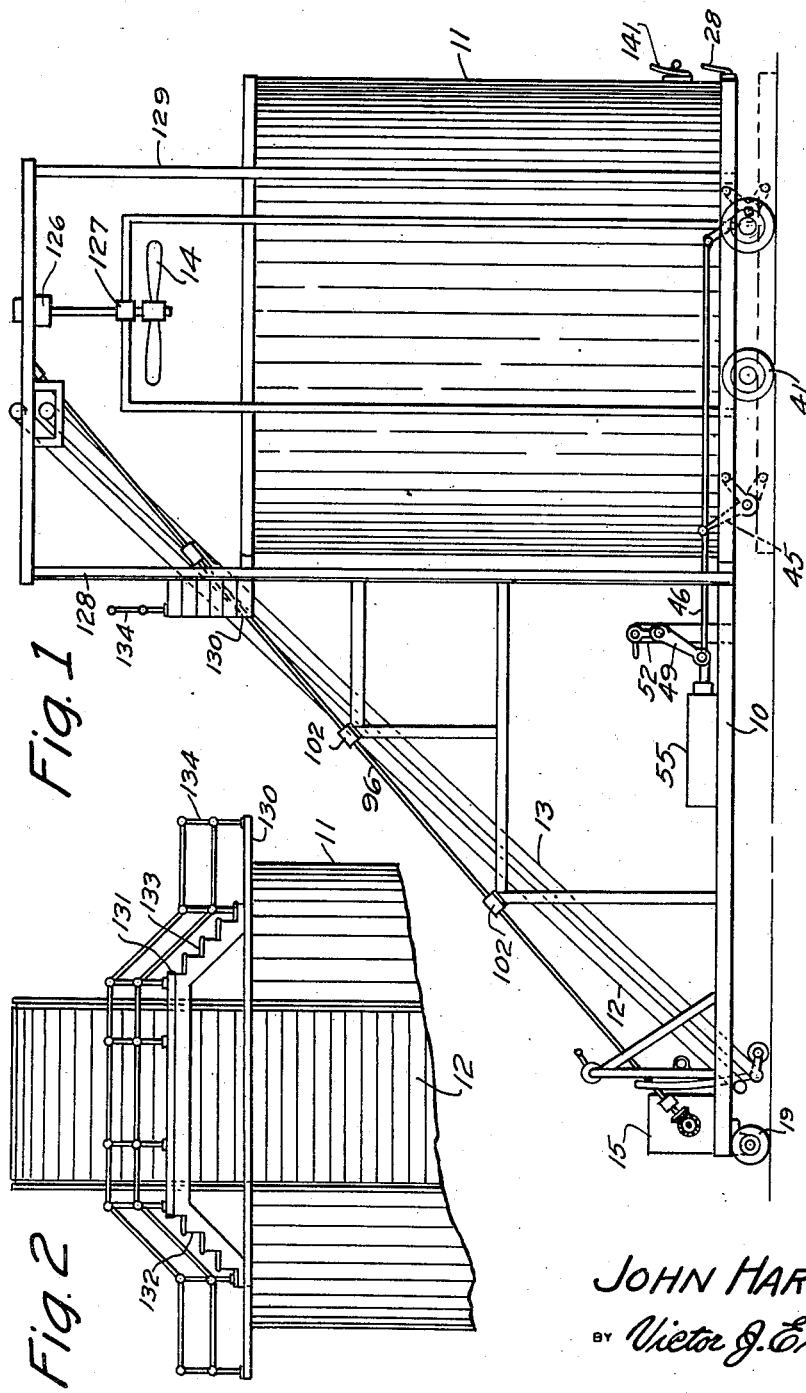
INVENTOR.
JOHN HARRINGTON
BY *Victor J. Evans & Co.*
ATTORNEYS

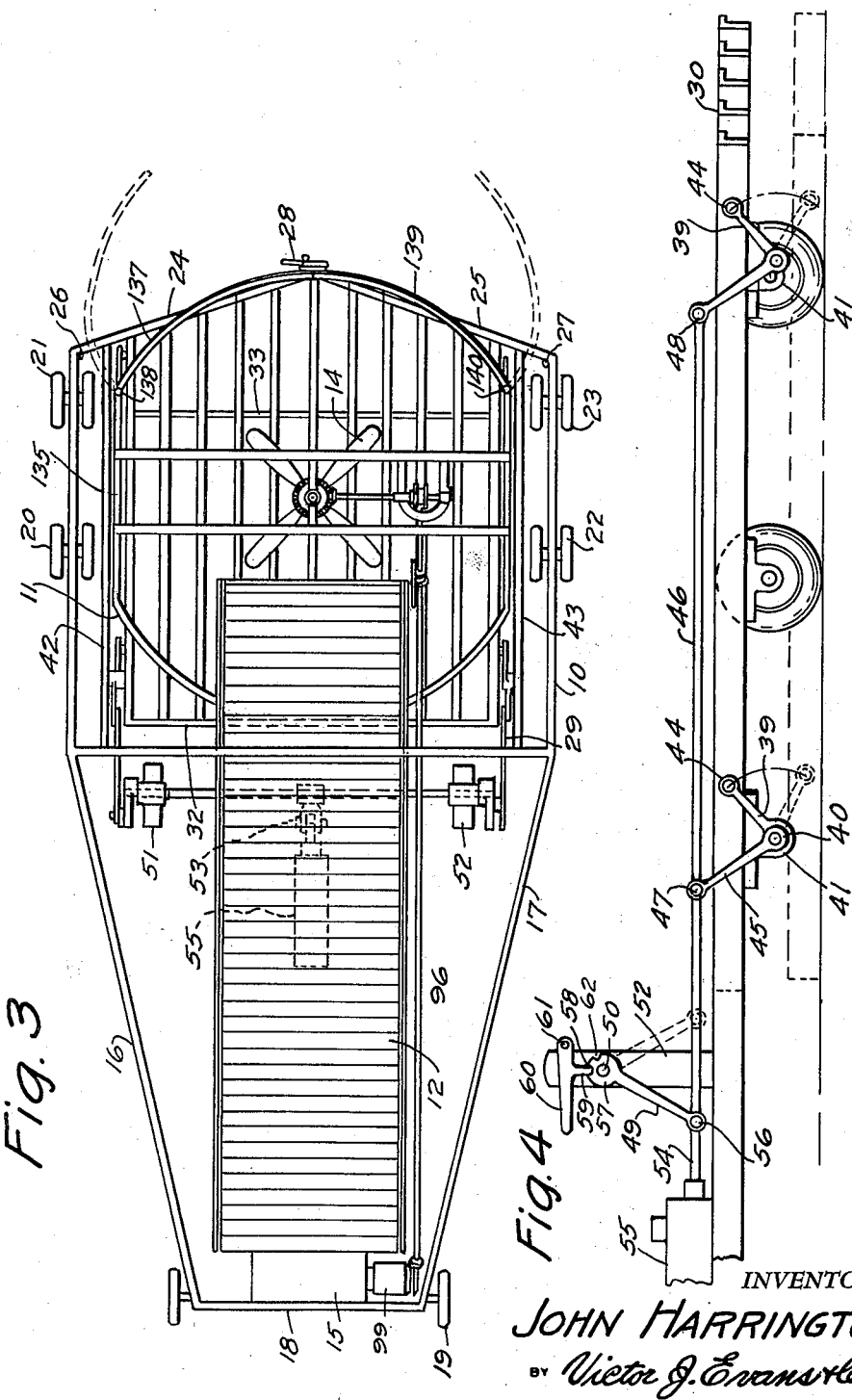

Aug. 18, 1953  J. HARRINGTON  2,648,945
PORTABLE HAYSTACKER
Filed July 28, 1949  4 Sheets-Sheet 3
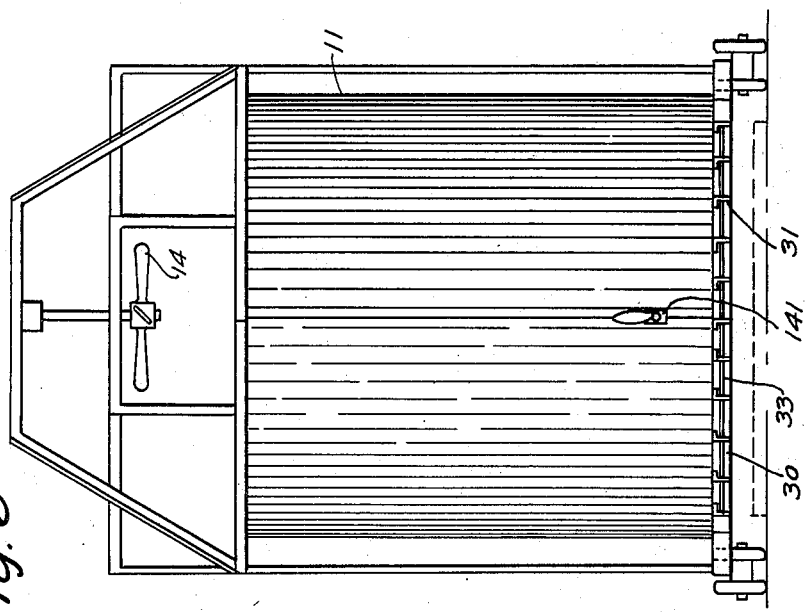
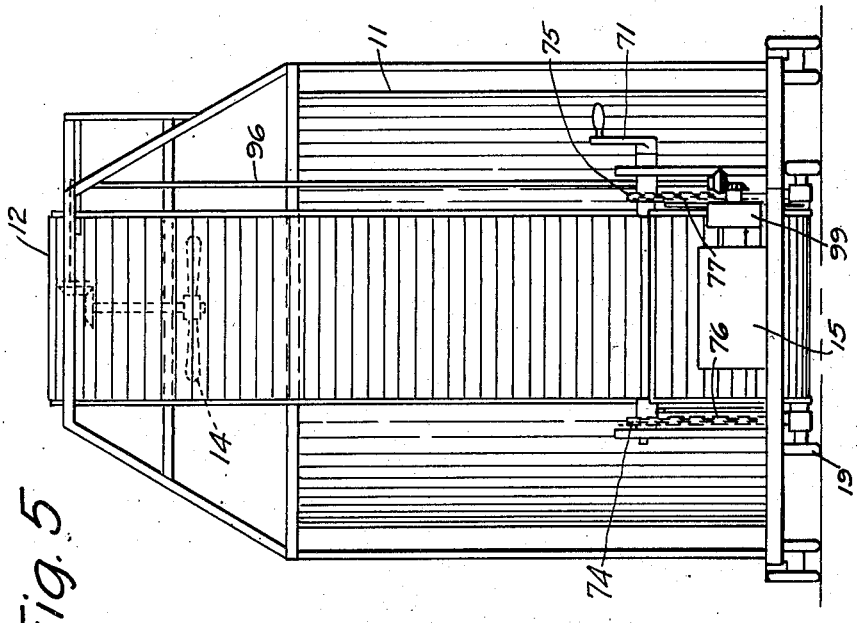
INVENTOR.
JOHN HARRINGTON
BY *Victor J. Evans & Co.*
ATTORNEYS

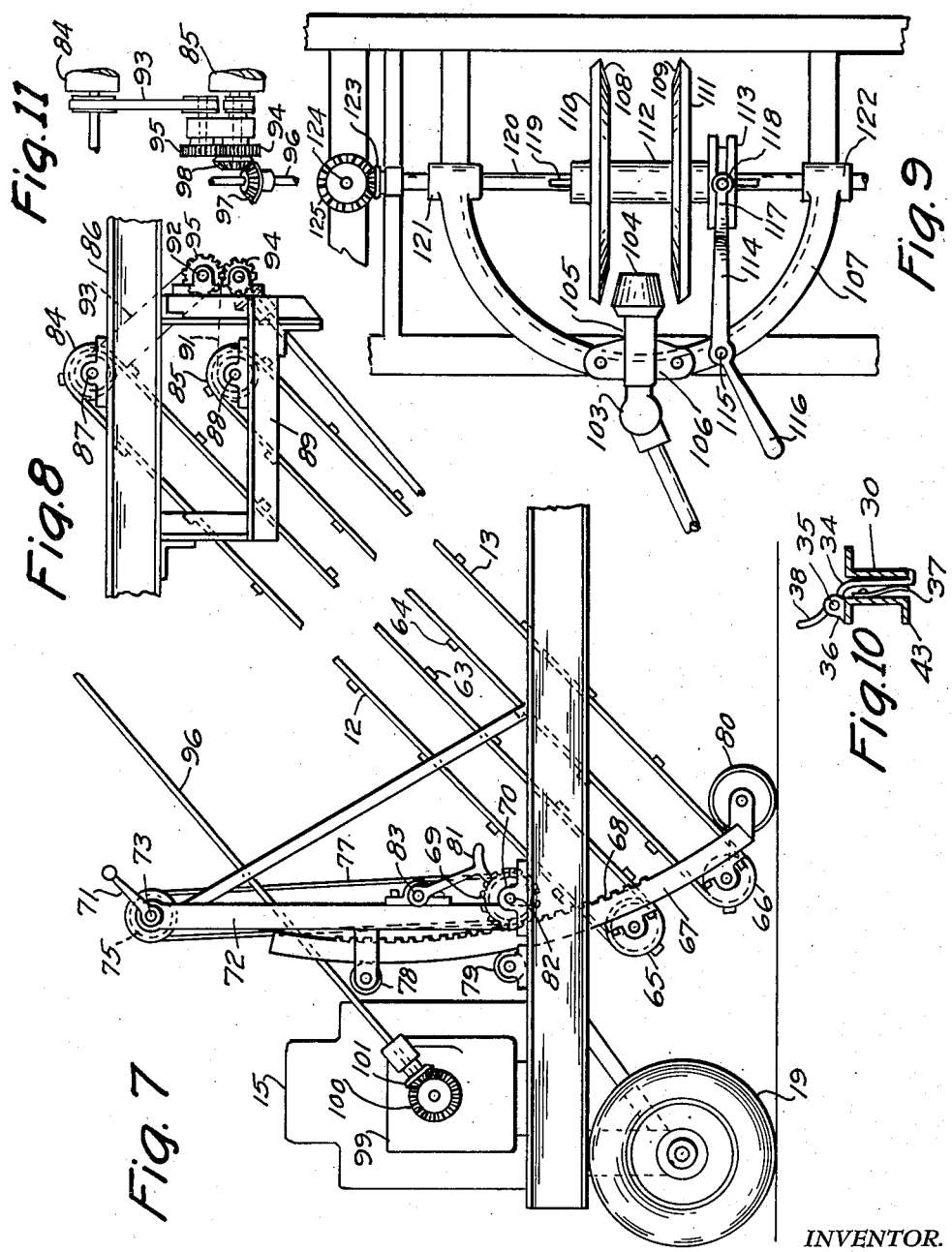

UNITED STATES PATENT OFFICE 2,648,945

PORTABLE HAYSTACKER

John Harrington, Rapid City, S. Dak.

Application July 28, 1949, Serial No. 107,363

1 Claim. (Cl. 56—346)

This invention relates to farm implements and particularly devices for picking up hay from windrows in a field, and in particular includes a relatively large platform having a vertically movable section therein with a cylinder the size of a hay stack and having gates at the rear position above the section and having means for elevating hay from a windrow to a position above the cylinder from which the hay is dropped upon a distributing fan and spread over the cylinder, and means for actuating the said vertically movable section of the platform.

The purpose of this invention is to facilitate stacking hay by providing means for automatically picking up hay in the field and stacking it upon a platform and then when the stack is completed, dropping a section of the platform whereby the complete haystack is dropped in position in the barnyard or as desired.

Where hay is stacked it is picked up from windrows in a field by automatic elevating devices or pitchforks, dumped upon trucks or wagons, carried to a point where it is desired to make the stack, thrown upon the stack, and then distributed by hand over the surface of the stack. This requires considerable handling and even with experienced haystackers a stack often contains pockets through which moisture seeps into the center and molds the hay. With this thought in mind this invention contemplates an automatic portable haystacker wherein the hay is continuously evenly distributed over the entire area of the stack by a fan and the entire stack is hauled to a suitable position and dumped as a unit from the truck or conveying means on which it is stacked.

The object of this invention is, therefore, to provide a haystacker wherein the hay is evenly distributed over a cylinder on a chassis as it is picked up from windrows in the field and the picking up device is also mounted on the chassis with the stack whereby the combination provides a unit that is conveyed over a field for simultaneously picking up and stacking the hay.

Another object of the invention is to provide a portable haystacker in which hay is stacked as it is picked up from the field in which the completed stack is conveyed thereby to a point where it is desired to permanently position the stack.

Another object of the invention is to provide a portable haystacker that picks up hay and dumps the hay into a cylinder of a sufficient size to accommodate a stack of hay in which means is provided for evenly distributing the hay over the entire area of the cylinder.

A further object of the invention is to provide a portable haystacker for automatically stacking hay as it is picked up from the field, which is of a comparatively simple and economical construction.

With these and other objects and advantages in view the invention embodies a comparatively large horizontally disposed chassis carried by wheels with a cylinder the size of a haystack positioned on the rear portion thereof, with a pair of spaced conveyors extended from a position relatively close to the ground to a point about the haystack cylinder, means for distributing the hay in the cylinder, and a hydraulic cylinder for raising and lowering a section of the platform of the chassis on which the stack is formed.

Other features and advantages of the invention will appear from the following description taken in connection with the drawings wherein:

Figure 1 is a view showing a side elevation of the haystacker.

Figure 2 is a detail showing the upper end of the cylinder in which the hay is stacked illustrating a cross walk extended across the conveyor thereof and with the lower part of the cylinder broken away.

Figure 3 is a plan view of the portable hystacker with parts omitted and with gates in the rear side of the haystack cylinder shown in the open position in dotted lines.

Figure 4 is a detail showing a longitudinal section on an enlarged scale through the rear portion of the platform of the portable haystacker with the haystacker cylinder, and arched shaped frames removed and is a view illustrating the means for raising and lowering the haystack section of the platform.

Figure 5 is a view showing a front elevation of the portable haystacker looking toward the pick up end thereof.

Figure 6 is a rear elevational view looking toward the discharge end of the portable haystacker and indicating the vertically movable section of the platform in the lower position in dotted lines.

Figure 7 is an enlarged detail view showing a side elevation of the front end of the portable haystacker illustrating the means for raising and lowering the lower pickup ends of the conveyors and with parts broken away.

Figure 8 is an enlarged detailed view showing the mounting of the upper ends of the conveyers with parts omitted and with parts broken away.

Figure 9 is an enlarged detailed view showing a plan view of the fan operating instrumentalities illustrating the means for rotating the fan clockwise or counterclockwise.

Figure 10 is an enlarged detailed sectional view showing a latch for holding the movable section of the platform.

Figure 11 is a detail showing the conveyor driving gears.

Referring now to the drawings wherein like reference characters denote corresponding parts the portable haystacker of this invention includes a platform or chassis 10, a haystack cylinder 11, inclined elevating conveyors 12 and 13, a distributing fan 14, and a motor 15.

The chassis 10 may be of any suitable design and in the design shown the forward section is formed with converging sides 16 and 17 connected at the forward end by a cross beam 18 and, as illustrated in the drawings the forward end is supported on wheels 19 whereas the rear portion is supported on pairs of wheels 20 and 21 at one side and 22 and 23 at the other. The rear ends of the side beams of the chassis 10 are provided with hinged sections 24 and 25 that are mounted by hinges 26 and 27 to the chassis, respectively, and these sections are held in the closed position by a latch 28 at the center.

The rear portion of the chassis is provided with an open section 29 rearwardly of the transversely disposed bearing 290 in which the haystack platform 30 is positioned and, as illustrated in Figures 3, 4 and 6 the platform 30 is formed with spaced longitudinally extended angles 31 connected by a cross beam 32 at the front and provided with a tie bar 33 that extends through the angles at a point spaced from the rear. The platform 30 is retained in the upper position by latches 34 pivotally mounted by pins 35 in projections 36, rigidly secured to the upper flange of each of the beams 42 or 43 of the chassis 10, while the latch will engage the lower flange of the angle 31, as illustrated in Figure 10 and the latches are resiliently held in the position of retaining the platform in the upper position by springs 37, which are secured to the web of each of the beams 42 or 43 and are positioned in the rear of each latch 34 as also illustrated in Fig. 10. The latches are provided with upwardly extended ends 38 by which they may be struck with a hammer or the like for releasing the platform.

The platform 30 is suspended by a plurality of cranks 39 pivotally mounted on pins 40 journaled in bearings 41 on the under surfaces of beams 42 and 43 of the platform or chassis 10.

The cranks 39 are pivotally attached to the sides of the platform 30 by bolts 44 and these cranks are actuated by levers 45 on ends of the shafts 40 which are connected to longitudinally extended rods 46 by pins 47 and 48. The rods 46 are connected to the lower ends of arms 49 on the ends of a shaft 50 journaled in posts 51 and 52, and the shaft 50 is provided with a centrally positioned arm 53 similar to the arms 49, and connected, at the lower end to a piston rod 54 of a hydraulic cylinder 55 by a bolt 56. With the arms 49 and 53 fixedly mounted on the shaft 50 pressure may be applied to a piston in the cylinder 55 to draw the piston rod inwardly to the position shown in Figure 4 wherein the rods 46 will draw the levers 45 forwardly and, through the cranks 39 elevate the platform 30 from the position shown in dotted lines in Figure 4 to the position shown in full lines. The hubs 57 of the arms 49 are provided with a notch 58 into which projection 59 of the lever 60 pivotally mounted on a pin 61 on the side of the post 52, will drop by gravity to lock the platform actuating instrumentalities in the upper or loading position. Another notch 62 may be provided in the hub to hold the platform in the lower position if found desirable.

With the parts arranged in this manner the cylinder 11 is filled with hay or sufficient hay is placed therein to form a stack and after the stacker has been conveyed to a suitable position for permanently stacking the hay the latch and platform actuating instrumentalities are released whereby the platform 30 drops downwardly to the position indicated by the dotted lines and as the device is moved forwardly a stack of hay resting on the platform 30 will slide from the platform and remain in position upon the ground.

The portable haystacker is provided with inclined belt conveyors 12 and 13 that may be provided with slats 63 and 64, respectively and these conveyors pick up hay from windrows in a field and convey the hay upwardly between the conveyors to a point positioned above the cylinder 11 where the hay drops downwardly upon the fan 14.

The conveyors 12 and 13 may be mounted and operated by any suitable means and in the design shown the lower or tail pulleys 65 and 66 thereof are mounted by bearings on an arcuate bar 67 and the inner surface of the bar is provided with teeth 68 that form a rack which meshes with a gear 69 on a driven shaft 70 journalled in bearings 700 secured to the chassis 10. The shaft 70 is rotated by a hand crank 71 journaled in the upper end of a post 72 which is secured to the chassis 10 adjacent one of the bearings 700 in vertical relation to the chassis. The hand crank being journalled in the post 72 by a stub shaft 73 and the shaft is provided with sprockets 74 and 75 which, through chains 76 and 77 rotate the gear 69 that meshes with the rack teeth 68 in bars 67 on opposite sides of the conveyors. The bar 67 may be held by guide rollers 78 and 79, guide roller 78 being journalled in the bearing 780 secured to the post 72 at right angles thereto, and the guide roller 79 is journalled in a bearing 790 secured to the chassis 10 adjacent the bearing 700 as illustrated in Figure 7. The lower ends of the bars 67 are provided with ground engaging rollers 80 that hold the lower ends of the conveyors spaced above the ground to prevent the conveyors digging into high spots, or the like. Ratchets 81 with projections 82 thereon for engaging the gear 69 are pivotally mounted on the post 72 by bolts 83 and with the projections 82 dropped into the gears the lower ends of the conveyors may be retained at any suitable elevation.

The upper ends of the conveyors 12 and 13 are provided with head pulleys 84 and 85, respectively, and pulley 84 is journaled on an upper beam 86 of the stacker frame through a shaft 87 journalled in a bearing 870 fixed to the beam 86 and the lower pulley 85 is journaled through a shaft 88 journaled by a bearing 880 secured to a bracket 89. As illustrated in Figure 8, the head pulley 85 on the shaft 88 is rotated from a shaft 90 by a belt 91 and the pulley 84 and shaft 87 is rotated from a shaft 92 by a belt 93. The shaft 92 is driven from the shaft 90 by meshing gears 94 and 95 and the shaft 90 is rotated from the motor 15 by an upwardly inclined shaft 96 through bevel gears 97 and 98. The shaft 96 is driven from the motor 15 through a gear reduction unit 99 and gears 100 and 101. The shaft 96 is supported in spaced bearings 102 positioned at points intermediate of the length thereof and carried by the superstructure of the stacker and frame.

The upper end of the shaft 96 drives the fan 14 through a universal joint 103 which drives a friction bevel pulley 104 on a stub shaft 105 in a bearing 106 of a yoke 107 and the pulley 104 is positioned to contact bevel surfaces 108 and 109 of discs 110 and 111, respectively, as illustrated in Figure 9. The discs 110 and 111 are keyed through a sleeve 112 which provides a hub, and the sleeve 112 is provided with a clutch collar 113 that may be manually actuated by a lever 114 pivotally mounted by a pin 115 mounted on the yoke 17 and the lever 114 is provided with a handle 116 at one end and a yoke 117 at the other with pins 118 in the ends of the yoke extended into opposite sides of the slots or angular groove in the clutch collar 113.

The hub 112 is keyed through a keyway 119 on a shaft 120 and the shaft, which is journaled in bearings 121 and 122 is provided with a gear 123 that meshes with a bevel gear 124 on the fan shaft 125 that is journaled in bearings 126 and 127 of the superstructure including the arch shape frames 128 and 129.

The superstructure is provided with a platform 130 that includes a walk 131 that extends substantially one third of the way around the cylinder 11 with stairs 132 and 133 therein for providing an elevated section to pass over the conveyors, and the walk is provided with a hand rail 134.

With the parts arranged in this manner the lower ends of the conveyors may be lowered to the position illustrated in Figure 7 and as the device is drawn over a field and preferably over windrows hay will be picked up by the conveyors and deposited in the cylinder 11, being distributed over the area of the cylinder by the fan 14.

The cylinder 11 which is positioned on the platform 30 is provided with short flat sides 135 and 136 and an arcuate gate 137 is connected to the rear end of the sides 135 by a hinge 138, and a similar gate 139 is connected by a hinge 140 to the end of the side 136. These gates are connected at the rear by a suitable latch 141.

With the haystack in the cylinder 11 the stacker is conveyed to a suitable position and the gates opened, the platform 30 lowered, and the chassis of the stacker with the parts mounted thereon drawn away, as herein before described. A stack of hay may, therefore, be automatically stacked in a bin on the stacker, conveyed to a suitable location, and deposited on the ground without disturbing the construction of the stack.

It will be understood that modifications may be made in the design and arrangement of the parts without departing from the spirit of the invention.

What is claimed is:

In a portable haystacker, a horizontally disposed platform, a cylinder supported on the rear of said platform, a motor supported on the front of said platform, wheels for supporting said platform, a first and second inclined conveyor extending from the front end of said platform to the top of said cylinder, a tail pulley connected to the lower end of each of said conveyors, arcuate bars connected to said tail pulleys and provided with a plurality of teeth on their inner surface, a horizontally disposed driven shaft positioned above said platform, gear wheels mounted on said shaft and meshing with the teeth on said bars, posts extending upwardly from said platform, a stub shaft journalled in the upper end of said posts, chain and sprocket means connecting said stub shaft to said driven shaft, guide rollers for supporting said bars, ground engaging rollers mounted on the lower ends of said bars, ratchets arranged in engagement with said gear wheels for maintaining the conveyors immobile in their adjusted positions, a fan rotatably supported above said cylinder and positioned rearwardly of said conveyors, and means connecting said motor to said fan and to said conveyors.

JOHN HARRINGTON.

References Cited in the file of this patent

UNITED STATES PATENTS

| Number | Name | Date |
| --- | --- | --- |
| 972,910 | Pippen | Oct. 18, 1910 |
| 1,257,161 | Walters et al. | Feb. 19, 1918 |
| 1,272,666 | Isom | July 16, 1918 |
| 1,704,190 | Hall | Mar. 5, 1929 |
| 1,936,603 | Larson | Nov. 28, 1933 |
| 2,035,705 | Kaser | Mar. 31, 1936 |
| 2,500,441 | Vander Schuur et al. | Mar. 15, 1950 |

FOREIGN PATENTS

| Number | Country | Date |
| --- | --- | --- |
| 268,174 | Great Britain | Mar. 31, 1927 |
| 338,851 | Great Britain | Nov. 24, 1930 |
| 87,259 | Sweden | July 2, 1936 |
| 508,216 | Great Britain | June 28, 1939 |

OTHER REFERENCES

Popular Science Monthly, June 1922, page 42.